(12) United States Patent
Block et al.

(10) Patent No.: US 7,676,558 B2
(45) Date of Patent: Mar. 9, 2010

(54) CONFIGURING SHARED DEVICES OVER A FABRIC

(75) Inventors: Timothy Roy Block, Rochester, MN (US); Yu-Cheng Hsu, Tucson, AZ (US); John Norbert McCauley, Tucson, AZ (US); Sean Patrick Riley, Tucson, AZ (US); William Griswold Sherman, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1480 days.

(21) Appl. No.: 10/987,381

(22) Filed: Nov. 12, 2004

(65) Prior Publication Data
US 2006/0104265 A1 May 18, 2006

(51) Int. Cl.
G06F 15/13 (2006.01)

(52) U.S. Cl. ............... 709/222; 709/220; 709/221; 709/228; 709/231; 709/250; 370/254; 370/255; 710/8; 710/10

(58) Field of Classification Search ............... 709/220, 709/221, 222, 228, 231, 250; 370/254, 255; 710/8, 10
See application file for complete search history.

(56) References Cited

U.S. PATENT DOCUMENTS

| 5,245,368 | A | 9/1993 | Farrell et al. |
| 5,377,109 | A | 12/1994 | Baker et al. |
| 5,488,716 | A | 1/1996 | Scheider et al. |
| 5,963,540 | A | 10/1999 | Bhaskaran |
| 6,101,508 | A | 8/2000 | Wolff |
| 6,247,023 | B1 | 6/2001 | Hsiao et al. |
| 6,636,982 | B1 | 10/2003 | Rowlands |

(Continued)

FOREIGN PATENT DOCUMENTS

JP 58128099 A 7/1983

(Continued)

OTHER PUBLICATIONS

US Patent Application, filed Nov. 12, 2004, entitled "Method, System, and Program for Handling a Device Failure", invented by Y. Hsu, J. N. McCauley, W. G. Sherman, & C. Song.

Primary Examiner—Jinsong Hu
(74) Attorney, Agent, or Firm—David W. Victor; Konrad Raynes & Victor LLP (57) ABSTRACT

Provided are a method, system, and program for configuring shared devices over a fabric. A module in a first processing complex configures a first part of a fabric enabling communication with a set of devices accessible through the first part of the fabric. The module detects a located device accessible through a second part of the fabric, wherein a second processing complex is designated to configure the second part of the fabric and the located device. The module determines whether the second processing complex is available in response to detecting the uninitialized device. The module passes to a device driver in the first processing complex an uninitialized property for the located device. The device driver requests the module to configure the second part of the fabric to enable access to the located device over the second part of the fabric in response to determining that the located device has the uninitialized property.

35 Claims, 5 Drawing Sheets

U.S. PATENT DOCUMENTS

| | | |
|---|---|---|
| 6,725,295 B2 * | 4/2004 | Iwatani ....................... 710/38 |
| 6,725,397 B1 | 4/2004 | Emberty et al. |
| 6,728,905 B1 | 4/2004 | Gnanasivam et al. |
| 6,732,166 B1 | 5/2004 | Woodruff |
| 6,738,818 B1 | 5/2004 | Shah |
| 7,152,178 B1 * | 12/2006 | Vook et al. ..................... 714/4 |
| 2003/0061475 A1 | 3/2003 | Gregg et al. |
| 2004/0033141 A1 | 2/2004 | Stillhard et al. |

FOREIGN PATENT DOCUMENTS

| | | |
|---|---|---|
| JP | 1053237 A | 3/1989 |
| JP | 3090936 A | 4/1991 |

* cited by examiner

FIG. 5

CONFIGURING SHARED DEVICES OVER A FABRIC

BACKGROUND OF THE INVENTION

1. Field of the Invention

The present invention relates to a method, system, and program for configuring shared devices over a fabric.

2. Description of the Related Art

In certain computing environments, multiple host systems may communicate with a control unit, such as an IBM Enterprise Storage Server (ESS)®, for data in a storage device managed by the ESS receiving the request. The control unit provides access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may include duplicate and redundant processing complexes, also known as clusters, to allow for failover to a surviving cluster in case one fails. The clusters may access shared devices.

During initialization, each processing complex in the control unit is responsible for configuring parts of the fabric, such as a Fibre Channel Arbitrated loop, providing a connection to the shared adaptors. For instance, one processing complex configures a first part of the fabric connected to a first set of shared adaptors and another processing complex configures a second part of the fabric connected to a second set of shared adaptors. Device drivers in the processing complex then configure the shared adaptors. However, if one processing complex is down during initialization, then that part of the fabric that is configured by the failed processing complex will remain uninitialized and the surviving processing complex will not have access to the shared adaptors accessed through that part of the fabric that is supposed to be configured by the failed processing complex. The surviving processing complex will however have access and use those shared adaptors accessible through the portion of the fabric configured by the surviving processing complex.

SUMMARY

Provided are a method, system, and program for configuring shared devices over a fabric. A module in a first processing complex configures a first part of a fabric enabling communication with a set of devices accessible through the first part of the fabric. The module detects a located device accessible through a second part of the fabric, wherein a second processing complex is designated to configure the second part of the fabric and the located device. The module determines whether the second processing complex is available in response to detecting the uninitialized device. The module passes to a device driver in the first processing complex an uninitialized property for the located device. The device driver requests the module to configure the second part of the fabric to enable access to the located device over the second part of the fabric in response to determining that the located device has the uninitialized property.

DETAILED DESCRIPTION

Figure 1:
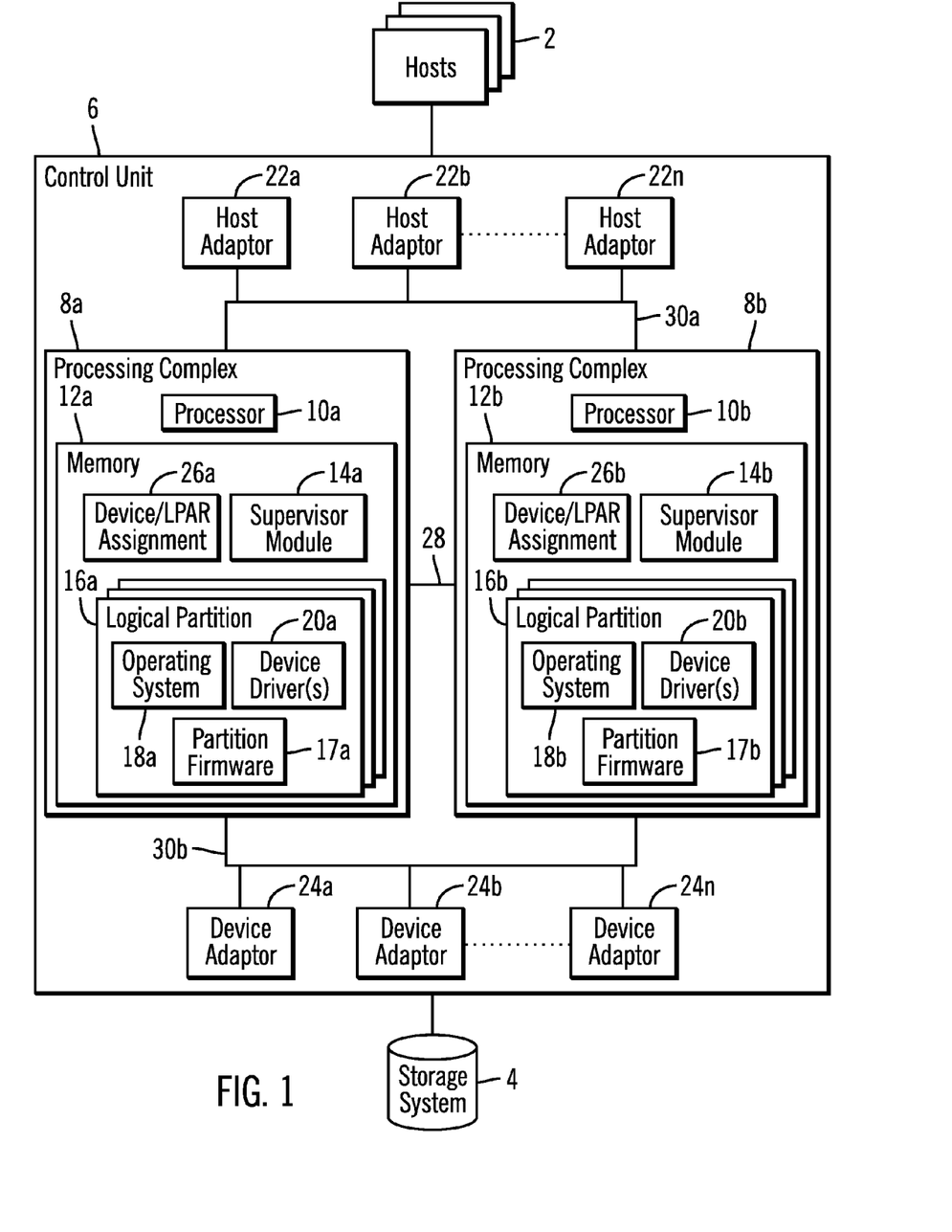
FIG. 1 illustrates a computing environment in which embodiments are implemented.

FIG. 1 illustrates a computing environment in which aspects of the invention are implemented. One or more hosts 2 communicate Input/Output (I/O) requests directed to a storage system 4 to a control unit 6, where the control unit 6 manages access to the storage system 4. In one embodiment, the control unit 6 is comprised of two processing complexes 8a, 8b, each including a processor 10a, 10b and a memory 12a, 12b. Each processing complex 8a, 8b includes a supervisor module 14a, 14b. The supervisor modules 14a, 14b comprise code that manage and coordinate the operations of one or more logical partitions 16a, 16b executing in the processing complexes 8a, 8b. Each logical partition 16a, 16b separately executes an operating system 18a, 18b and device drivers 20a, 20b. The logical partitions comprise a division of the processors 10a, 10b into logical independent processing systems each having their own partition firmware 17a, 17b, operating systems 18a, 18b and device drivers 20a, 20b. Multiple logical partitions may execute in each processing complex, managed by the supervisor module for that complex. Each logical partition 16a, 16b includes partition code 17a, 17b to manage partition related operations, such as communicating with the supervisor module 14a, 14b.

Each device driver 20a, 20b provides an interface between the operating system 18a, 18b, in the logical partition 16a, 16b in which the device driver 20a, 20b executes, and an external device, such as host adaptors 22a, 22b . . . 22n and device adaptors 24a, 24b . . . 24n. The host adaptors 22a, 22b . . . 22n enable the processing complexes 8a, 8b to communicate with the hosts 2 and the device adaptors 24a, 24b . . . 24n enable the processing complexes 8a, 8b to communicate with the storage system 4. Thus, the processing complexes 8a, 8b share devices, such as adaptors 22a, 22b . . . 22n, 24a, 24b . . . 24n. The variable "n" is used to denote an integer instance of an element, and may indicate different or the same integer value when used with different elements. For instance, 22n and 24n may indicate a same or different number of host adaptors 22n and device adaptors 24n.

The processing complexes 8a, 8b communicate with the host adaptors 22a, 22b . . . 22n over a fabric 30a and the device adaptors 24a, 24b . . . 24n over a fabric 30b. The fabrics 30a, 30b may comprise one or more interfaces providing communication paths between the processing complexes 8a, 8b and adaptors. In one embodiment, the fabric may comprise a Fibre Channel arbitrated loop configuration, a serial loop architecture or a bus interface, such as a Peripheral Component Interconnect (PCI) interface. Each processing complex 8a, 8b may be assigned a portion of the adaptors 22a, 22b . . . 22n, 24a, 24b . . . 24n and during initialization, the supervisor module 14a, 14b within the processing complexes 8a, 8b initializes portions of the fabrics 30a, 30b providing communication paths with the adaptors that are assigned to that processing complex. For instance, if processing complex 8a is assigned adaptors 22a, 22b, 24a, 24b, then the supervisor module 14a of processing complex 8a initializes and configures that portion of the fabric 30a, 30b enabling communication between processing complex 8a and adaptors 22a, 22b, 24a, 24b. Likewise, if processing complex 8b is assigned adaptors 22n and 24n, then the supervisor module 14b of processing complex 8b initializes and configures that portion of the fabric 30a, 30b enabling communication between processing complex 8b and adaptors 22n and 24n. Configuring the fabrics 30a, 30b comprises setting registers in fabric hardware, e.g., the Fibre Channel loop hardware or bus interface hardware, and performing other initialization and discovery related operations.

The supervisor modules 14a, 14b maintain device/logical partition (LPAR) assignments 26a, 26b identifying an assignment of the adaptors 22a, 22b ... 22n, 24a, 24b ... 24n to a logical partition 16a, 16b in each processing complex 8a, 8b, such that communication between a specific adaptor 22a, 22b ... 22n, 24a, 24b ... 24n and the processing complex 8a, 8b is handled by the device driver 20a, 20b executing in the logical partition 16a, 16b assigned to the specific adaptor 22a, 22b ... 22n, 24a, 24b ... 24n.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b ... 24n, over a device network (not shown), which may comprise a local area network (LAN), storage area network (SAN), bus interface, serial interface, etc. Further, the processing complexes 8a, 8b may communicate over a connection 28 enabling processor inter-communication to manage configuring operations performed with respect to the shared devices, such as the shared adaptors 22a, 22b ... 22n, 24a, 24b ... 24n. In alternative embodiments, there may be only one fabric connecting all adaptors 22a, 22b ... 22n, 24a, 24b ... 24n, i.e., fabrics 30a and 30b are part of a single interconnected fabric, two fabrics, such as shown 30a and 30b, or more than two fabrics. The host 22a, 22b ... 22n and device 24a, 24b ... 24n adaptors may connect via separate fabrics, such as 30a and 30b shown in FIG. 1, or connect on a same fabric.

The control unit 6 may comprise any type of server, such as an enterprise storage server, storage controller, etc., or other device used to manage I/O requests to attached storage system (s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6, via the adaptors 22a, 22b ... 22n, over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface.

Figure 2:
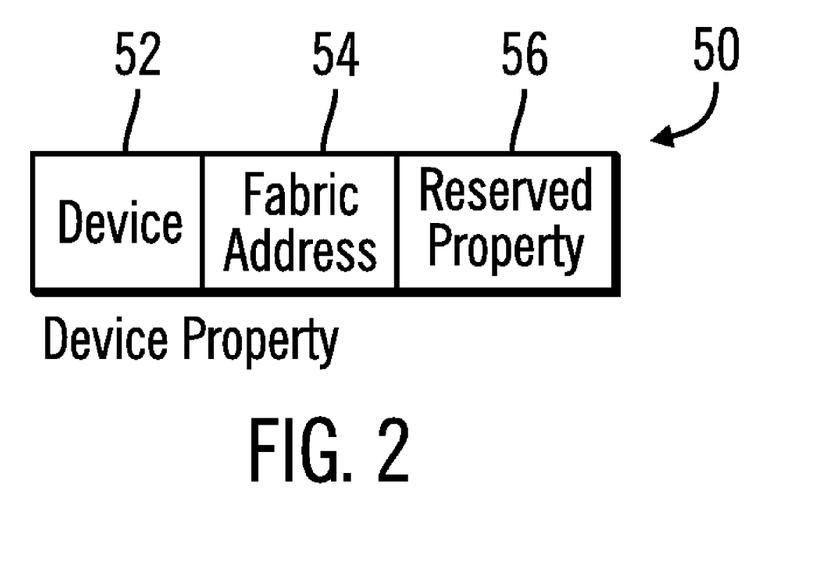
FIG. 2 illustrates an embodiment of device property information.

FIG. 2 illustrates device property 50 information the supervisor module 14a, 14b sets for devices located on the fabrics 30a, 30b. The device field 52 identifies the device, e.g., adaptor 22a, 22b ... 22n, 24a, 24b ... 24n; the fabric address 54 identifies an address of the device in the fabric 30a, 30b, which could be used to communicate with the devices; and the reserved property 56 indicates whether a particular located device 22a, 22b ... 22n, 24a, 24b ... 24n is "reserved initialized" and ready to be configured by the device driver 20a, 20b for access or "reserved uninitialized" such that the device 22a, 22b ... 22n, 24a, 24b ... 24n cannot be configured by the device driver 20a, 20b. The device 22a, 22b ... 22n, 24a, 24b ... 24n may not be able to be configured if the portion of the fabric 30a, 30b connecting to the device 22a, 22b ... 22n, 24a, 24b ... 24n has not been configured and initialized by one processing complex 8a, 8b.

Figure 3:
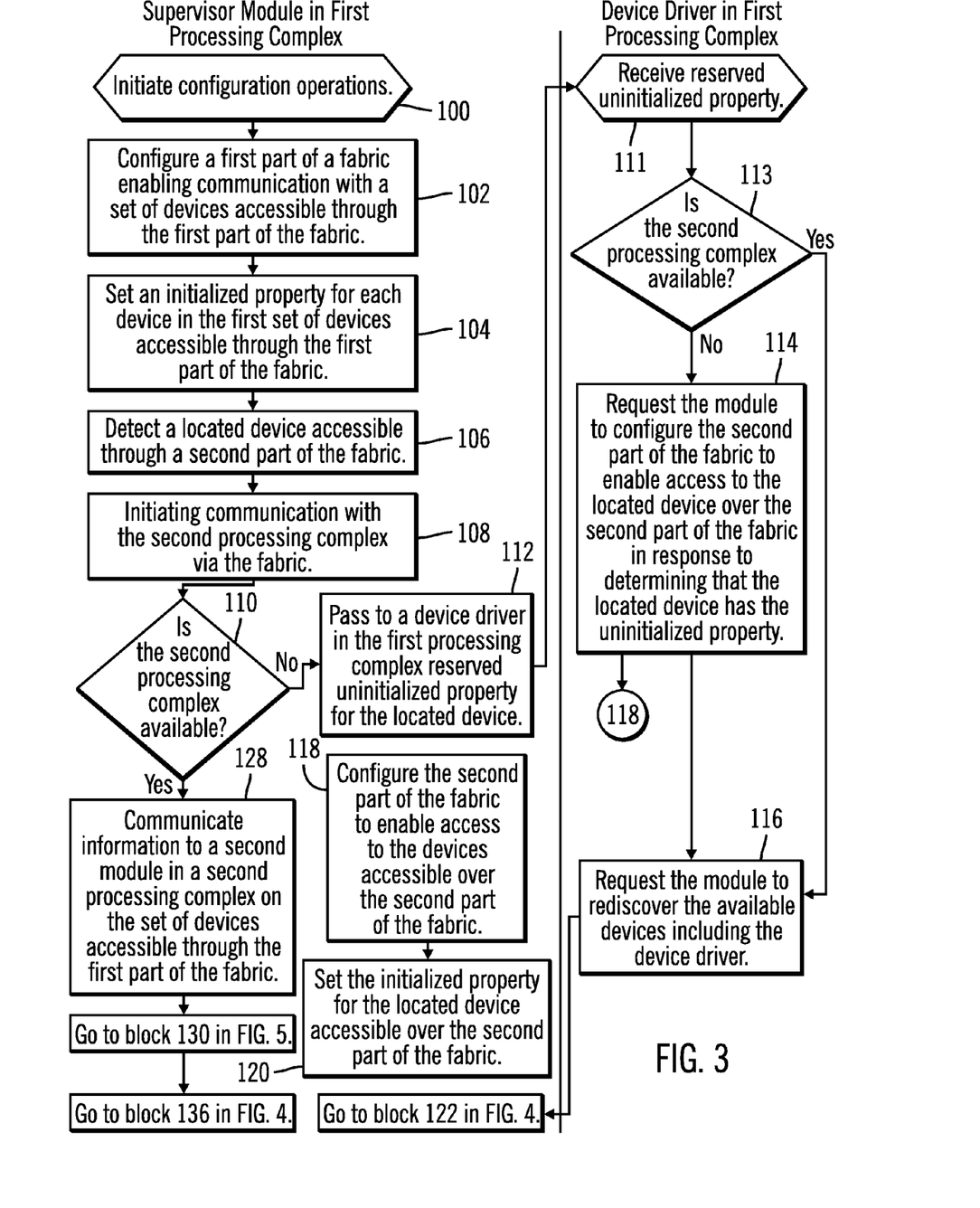
FIGS. 3, 4, and 5 illustrate an embodiment of operations to configure a fabric and shared devices accessible over the fabric.
Figure 4:
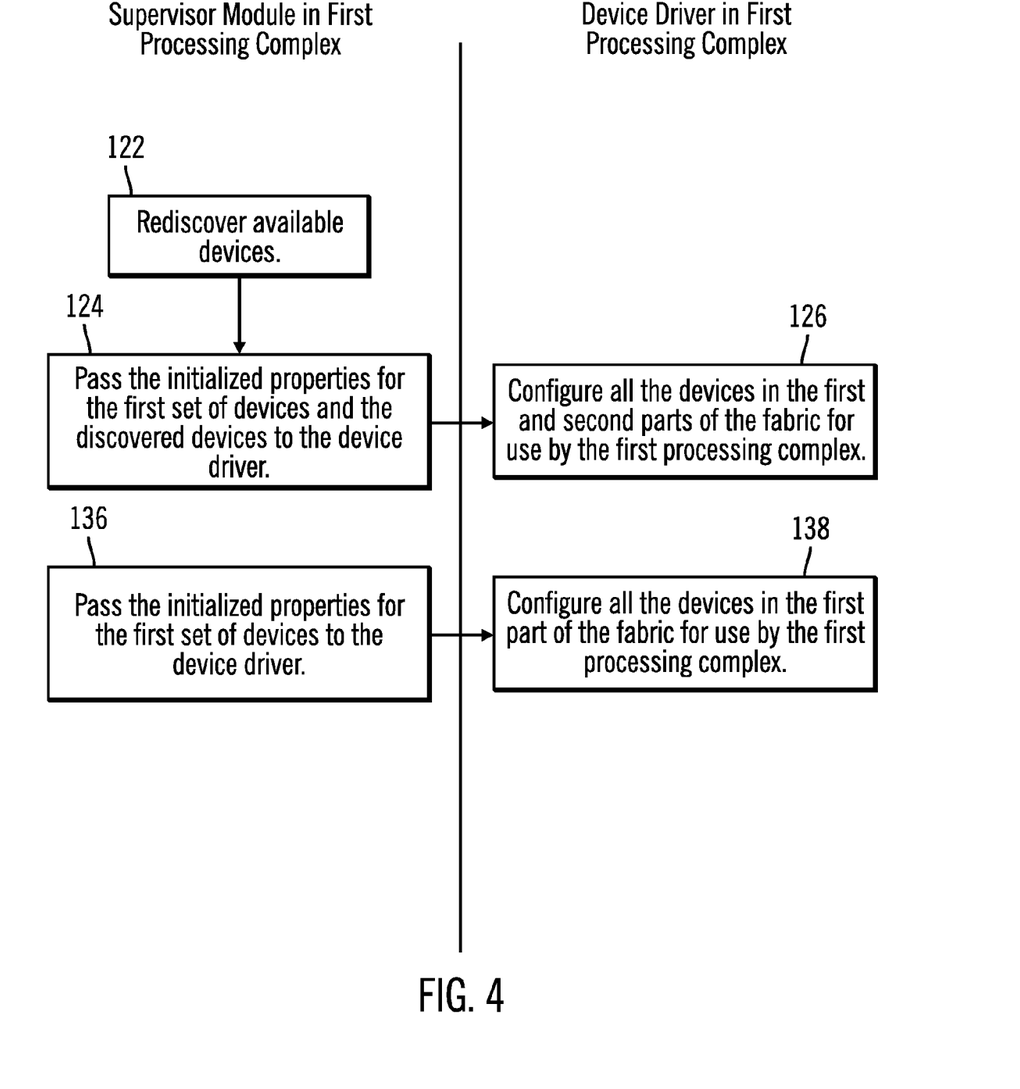
Figure 5:
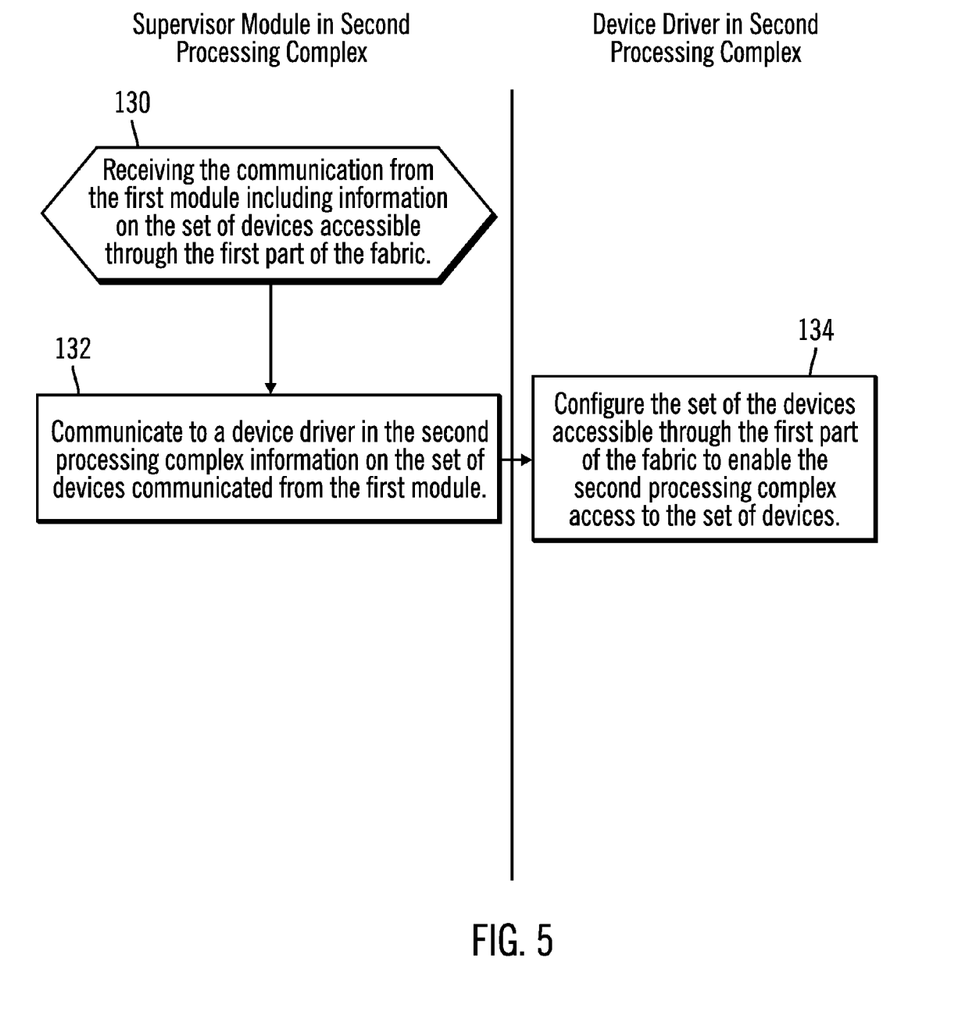

FIGS. 3, 4, and 5 illustrate operations performed by the various components in the processing complexes 8a, 8b, such as the supervisor modules 14a, 14b, device driver 20a, 20b, to manage the configuration of the fabrics 30a, 30b and adaptors 22a, 22b ... 22n, 24a, 24b ... 24n. In the described embodiment of FIGS. 3, 4, and 5, processing complexes 8a and 8b and their respective components are described as a "first" and "second" processing complexes and components, respectively. However, both processing complexes 8a, 8b and their components are capable of performing the same operations and either can function as the described "first" or "second" processing complexes and components.

With respect to FIG. 3, upon initiating (at block 100) configuration operations, a first supervisor module 14a in the first processing complex 8a configures (at block 102) a first part of a fabric 30a, 30b enabling communication with a set of devices accessible through the first part of the fabric, e.g., adaptors 22a, 22b, 24a, 24b. In one embodiment, each supervisor module 14a, 14b is programmed to configure and initialize a specific portion of the fabric 30a, 30b components connecting to those adaptors 22a, 22b ... 22n, 24a, 24b ... 24n that are configured by the processing complex 8a, 8b including that supervisor module 14a, 14b. The first supervisor module 14a sets (at block 104) an initialized property, e.g., reserved property 56 (FIG. 2) to "reserved initialized", for each device 22a, 22b ... 22n, 24a, 24b ... 24n in the first set of devices accessible through the first part of the fabric 30a, 30b. The supervisor module 14a detects (at block 106) one or more located devices that are accessible through a second part of the fabric that is intended to be configured by the second processing complex 8b. The supervisor module 14a initiates (at block 108) communication with the second processing complex 8b via the fabric 30a, 30b.

If (at block 110) the second processing complex is not available, i.e., does not respond to the communication, then the supervisor module 14a passes (at block 112) to a device driver 20a in the first processing complex a reserved uninitialized property for the located device indicating that the located device will not be configured by the second processing complex 8b which was determined to be unavailable. In embodiments where there are multiple logical partitions 16a in the processing complex 8a that are assigned to handle the configuration of different of the devices as indicated in the device/LPAR assignment 26a, then the supervisor module 18a forwards the uninitialized property for the located device, e.g., 22n, 24n, to the logical partition 16a assigned to configure and handle communication for that located device 22n, 24n. Further, if there are multiple located devices having the uninitialized property, i.e., will not be configured by the second processing complex 8b, then the supervisor module 18a sends the reserved uninitialized property for each located device to the device driver(s) 20a in the one or more logical partitions 16a assigned to manage the located device 22n, 24n.

Further, when passing the device properties to the device driver 20a, 20b, the module 14a may pass the device properties to partition firmware 17a, 17b, which upon noting that the properties are reserved, forwards the properties to the operating system 18a, which in turn upon noticing that the properties are "reserved" forwards the device properties 50 to the device driver 20a, 20b. In this way, the "reserved initialized" or "reserved uninitialized" indicates to the partition firmware 17a, 17b and operating systems 18a, 18b that the property and configuration information for the device is "reserved" for the device driver 20a, 20b.

In response to receiving (at block 111) the "reserved uninitialized" property for the located device 22n, 24n, the device driver 20a determines (at block 113) whether the second processing complex 8b has become available. In such case, the second processing complex 8b would have performed the operations at block 100 to initialize the second part of the fabric 30a, 30b assigned to the second processing complex 8b. If (at block 113) the second processing complex 8b has become available then control proceeds to block 116. Otherwise, if the second processing complex 8b remains unavailable, then the device driver 20a requests (at block 114) the supervisor module 14a to configure the second part of the fabric 30a, 30b to enable access to the located device 22n over the second part of the fabric 30a, 30b in response to determining that the located device has the reserved uninitialized property. In response to the request from the device driver 20a at block 114, the supervisor module 14a configures (at block 118) the second part of the fabric 30a, 30b to enable access to the devices, e.g., 22n, 24n accessible over the second part of the fabric 30a, 30b. The first supervisor module 14a sets (at block 120) the initialized property for the located device, e.g., 22n 24n, accessible over the second part of the fabric 30a, 30b. Further, the device driver 20a, in addition to requesting (at block 114) that the first supervisor module 14a reconfigure the second part of the fabric 30a, 30b, the device driver 20a may also request (at block 116) the first supervisor module 14a to rediscover available devices. If the rediscovery occurs following block 114, then the supervisor module 14a would configure the entire fabric 30a, 30b and all the devices may be discovered. If the rediscovery occurs without performing 114 and 118, then the device driver 20a discovers those devices available on paths in the first part of the fabric. In one embodiment, the rediscovery operation may be implemented by the device driver 20a requesting the supervisor module 14a to reboot the partition, e.g., LPAR, including the device driver 20a.

With respect to FIG. 4, in response to the rediscovery request, the first supervisor module 14a rediscovers (at block 122) the available devices, over the first part of the fabric 30a, 30b (if the second processing complex 8b is available) or first and second parts of the fabric 30a, 30b (if the second processing complex 8b is unavailable) and passes (at block 124) the initialized properties for the first set of devices 22a, 22b, 24a, 24b on the first part of the fabric 30a, 30b and the located device 22n, 24n on the second part of the fabric to the device driver 20a (or the device drivers in the different LPARs in the first processing complex 8a designated to configure the devices). In response to receiving the rediscovered devices and receiving the initialized properties, the device driver 20a configures (at block 126) all the devices 22a, 22b . . . 22n, 24a, 24b . . . 24n in the first and second parts of the fabric 30a, 30b for use by the first processing complex 8a. In one embodiment, the rediscover operation may be implemented by the device driver 20a requesting the supervisor module 14a to reboot the partition, e.g., LPAR, including the device driver 20a.

If (at block 110) the first processing complex 8a determines that the second processing complex 8b is available, then the first supervisor module 14a communicates (at block 128 in FIG. 3) information to a second supervisory module 14b in the second processing complex 8b on the set of devices, e.g., 22a, 22b, 24a, 24b, accessible through the first part of the fabric 30a, 30b. Control then proceeds to block 130 in FIG. 5 where the second supervisor module 8b receives the communication and then communicates (at block 132) to a device driver 20b in the second processing complex 8b information on the set of devices communicated from the first module 14a accessible over the first part of the fabric 30a, 30b. In one embodiment, the second supervisor module 14b would determine the device drivers 20b designated to manage communication with the set of devices indicated in the received information from the device/LPAR assignment 26b. The reserved initialized information for the set of devices 22a, 22b, 24a, 24b is then sent to the device drivers 20b designated to manage communication for those devices. The device driver(s) 20b receiving the information then configures (at block 134) the set of the devices accessible through the first part of the fabric to enable the second processing complex 8b access to the set of devices.

In addition to communicating information on the devices configured by the first processing complex 8a to the second supervisor module 14b, the first supervisor module 14a proceeds to block 136 in FIG. 4 to pass the initialized properties for the first set of devices to the device driver 20a to configure. As discussed, if there are multiple device drivers 20a executing in multiple LPARs 16a, then the supervisor module 14a would use the device LPAR assignment 26a, to pass initialized properties for devices to the device drivers assigned to manage the devices. The device driver 20a configures (at block 138) all the devices in the first part of the fabric for use by the first processing complex in shared mode. In shared mode, the device driver 20a communicates with the second processing complex 8b to coordinate their usage of the shared devices 22a, 22b . . . 22n, 24a, 24b . . . 24n.

With the described embodiments, both processing complexes are configured to attempt to configure a portion of the fabric to share the configuration of the shared devices, such as adaptors. If one processor complex is down, then the other processor complex will take over the configuration of the entire fabric to enable the surviving processor complex to utilize all shared devices. Otherwise, if both processors are available, both processors will share in the initialization and configuration of the fabric and devices, and then coordinate their access and management of the shared devices.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In embodiments where the processing complexes have multiple logical partitions, the supervisor manages the execution of different logical partitions. In embodiments, where the processing complex does not have logical partitions, the supervisor module may comprise an intermediate device driver.

In the described embodiments, the control unit 6 included two processing complexes 8a, 8b. In additional embodiments, there may be more than two systems accessing a shared device. In such embodiments, the two or more processing complexes may configure the fabric and coordinate the handling of failures of one processing complex to configure its portion of the fabric.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    configuring, by a module in a first processing complex, a first part of a fabric enabling communication with a set of devices accessible through the first part of the fabric;
    detecting, by the module, a located device accessible through a second part of the fabric, wherein a second processing complex is designated to configure the second part of the fabric and the located device;
    determining, by the module, whether the second processing complex is available in response to detecting the located device;
    passing, by the module, to a device driver in the first processing complex an uninitialized property for the located device in response to determining that the second processing complex is not available; and
    requesting the module, by the device driver, to configure the second part of the fabric to enable access to the located device over the second part of the fabric in response to determining that the located device has the uninitialized property.

2. The method of claim 1, wherein determining, by the module, that the second processing complex is unavailable comprises:
    initiating, by the module, communication with the second processing complex via the fabric, wherein the second processing complex is determined to be unavailable if the second processing complex does not respond to the initiated communication.

3. The method of claim 1, wherein the module comprises a first module, further comprising:
    communicating, by the first module, information to a second module in a second processing complex on the set of the devices accessible through the first part of the fabric in response to determining that the second processing complex is available;
    communicating, by the second module, to a device driver in the second processing complex, information on the set of the devices communicated from the first module; and
    configuring, by the device driver in the second processing complex, the set of the devices accessible through the first part of the fabric to enable the second processing complex access to the set of the devices in response to the communication of the information from the second module.

4. The method of claim 1, further comprising:
    setting, by the module, an initialized property for each device in a first set of the devices accessible through the first part of the fabric; and
    configuring, by the module, the second part of the fabric to enable access to the devices accessible over the second part of the fabric in response to the request.

5. The method of claim 4, further comprising
    setting, by the module, the initialized property for the located device accessible over the second part of the fabric in response to configuring the second part of the fabric; and
    configuring, by the device driver, all the devices in the first and second parts of the fabric for use by the first processing complex in response to the initializing of the initialized property for the located device accessible.

6. The method of claim 4, further comprising:
    presenting, by the module, the properties for the devices located on the fabric having the uninitialized or initialized properties to an operating system in response to configuring the second part of the fabric; and
    presenting, by the operating system, to the device driver the properties for the detected devices on the fabric having the initialized or uninitialized properties.

7. The method of claim 1, further comprising:
    managing, by the module, operations of multiple logical partitions each executing a separate operating system and device driver interfacing to the devices; and
    determining, by the module, a logical partition assigned to the located device from an assignment of logical partitions to the devices, wherein the uninitialized property for the located device is passed to the device driver in the determined logical partition.

8. The method of claim 1, further comprising:
    configuring, by the module, the second part of the fabric to enable communication with the located device in response to the request by the device driver; and
    configuring, by the device driver, the located device having the property to enable access to the located device in response to the module configuring the second part of the fabric.

9. The method of claim 8, further comprising:
    requesting to the module, by the device driver, to rediscover available devices in response to the module configuring the second part of the fabric, wherein the device driver configures the located device in the second part of the fabric to enable access to the located device in response to rediscovering the available devices; and
    passing the initialized properties for the first set of the devices and the located device to the device driver, wherein the device driver configures all the devices having the initialized property set to enable access to the devices over the first and second part of the fabric.

10. The method of claim 1, wherein the device driver in the first processing complex comprises a first device driver, further comprising:
configuring, by the first device driver, the devices accessible over the fabric to enable access to the devices in response to the module configuring the first and second parts of the fabric;
communicating, by the first device driver, with a second device driver in the second processing complex when accessing the devices accessible over the fabric in response to determining that the second processing complex is available, and
enabling access, by the first device driver, to the devices accessible over the fabric without communicating with the second device driver in response to determining that the second processing complex is unavailable.

11. The method of claim 1, further comprising:
determining, by the device driver, whether the second processing complex is available in response to receiving the uninitialized property, wherein the device driver requests the first module to configure the second part of the fabric in response to determining that the second processing complex is unavailable.

12. A system, comprising:
a fabric;
a plurality of devices accessible through the fabric;
a first processing complex capable of accessing the devices over the fabric;
a second processing complex capable of accessing the devices over the fabric;
a module and device driver executing in the first processing complex to cause the first processing complex to perform:
configuring, by the module, a first part of the fabric enabling communication with a set of the devices accessible through the first part of the fabric;
detecting, by the module, a located device accessible through a second part of the fabric, wherein the second processing complex is designated to configure the second part of the fabric and the located device;
determining, by the module, whether the second processing complex is available in response to detecting the located device;
passing, by the module, to the device driver in the first processing complex an uninitialized property for the located device in response to determining that the second processing complex is not available; and
requesting the module, by the device driver, to configure the second part of the fabric to enable access to the located device over the second part of the fabric in response to determining that the located device has the uninitialized property.

13. The system of claim 12, wherein determining, by the module, that the second processing complex is unavailable, comprises:
initiating, by the module, communication with the second processing complex via the fabric, wherein the second processing complex is determined to be unavailable if the second processing complex does not respond to the initiated communication.

14. The system of claim 12, wherein the module and device driver comprise a first module and first device driver, respectively, and further comprising:
a second module and second device driver executing in the second processing complex,
wherein the first module further causes the first processing complex to communicate information to the second module on the set of the devices accessible through the first part of the fabric in response to determining that the second processing complex is available;
wherein the second module and second device driver cause the second processing complex to perform:
communicating, by the second module, to the second device driver information on the set of the devices communicated from the first module; and
configuring, by the second device driver, the set of the devices accessible through the first part of the fabric to enable the second processing complex access to the set of the devices in response to the communication of the information from the second module.

15. The system of claim 12, wherein the module further causes the first processing complex to perform:
setting an initialized property for each device in the first set of the devices accessible through the first part of the fabric; and
configuring the second part of the fabric to enable access to the devices accessible over the second part of the fabric in response to the request.

16. The system of claim 15, wherein the module and device driver further cause the first processing complex to perform:
setting, by the module, the initialized property for the located device accessible over the second part of the fabric in response to configuring the second part of the fabric; and
configuring, by the device driver, all the devices in the first and second parts of the fabric for use by the first processing complex in response to the initializing of the initialized property for the located device accessible.

17. The system of claim 15, wherein the first processing complex further includes an operating system, wherein the module and operating system further cause the first processing complex to perform:
presenting, by the module, the properties for the devices located on the fabric having the uninitialized or initialized properties to an operating system in response to configuring the second part of the fabric; and
presenting, by the operating system, to the device driver the properties for the detected devices on the fabric having the initialized or uninitialized properties.

18. The system of claim 12, wherein the module further causes the first processing complex to perform:
managing operations of multiple logical partitions each executing a separate operating system and device driver interfacing to the devices; and
determining a logical partition assigned to the located device from an assignment of logical partitions to the devices, wherein the uninitialized property for the located device is passed to the device driver in the determined logical partition.

19. The system of claim 12, wherein the module and device driver further cause the first processing complex to perform:
configuring, by the module, the second part of the fabric to enable communication with the located device in response to the request by the device driver; and
configuring, by the device driver, the located device having the property to enable access to the located device in response to the module configuring the second part of the fabric.

20. The system of claim 19, wherein the module further causes the first processing complex to perform:
requesting to the module, by the device driver, to rediscover available devices in response to the module configuring the second part of the fabric, wherein the device driver configures the located device in the second part of the fabric to enable access to the located device in response to rediscovering the available devices; and passing, by the module, the initialized properties for the first set of the devices and the located device to the device driver, wherein the device driver configures all the devices having the initialized property set to enable access to the devices over the first and second part of the fabric.

21. The system of claim 12, wherein the device driver in the first processing complex comprises a first device driver, further comprising:

a second device driver in the second processing complex;

wherein the first device driver further causes the first processing complex to perform:

configuring the devices accessible over the fabric to enable access to the devices in response to the module configuring the first and second parts of the fabric;

communicating with the second device driver in the second processing complex when accessing the devices accessible over the fabric in response to determining that the second processing complex is available, and enabling access to the devices accessible over the fabric without communicating with the second device driver in response to determining that the second processing complex is unavailable.

22. The system of claim 12, wherein the first device driver further causes the first processing complex to perform:

determining whether the second processing complex is available in response to receiving the uninitialized property, wherein the device driver requests the first module to configure the second part of the fabric in response to determining that the second processing complex is unavailable.

23. An article of manufacture comprising a computer readable storage device having a module and device driver executed by a first processing complex in communication with devices over a fabric and in communication with a second processing complex, wherein the module and the device driver are enabled to cause the first processing complex to perform operations, the operations comprising:

configuring, by the module, a first part of the fabric enabling communication with a set of the devices accessible through the first part of the fabric;

detecting, by the module, a located device accessible through a second part of the fabric, wherein the second processing complex is designated to configure the second part of the fabric and the located device;

determining, by the module, whether the second processing complex is available in response to detecting the located device;

passing, by the module, to the device driver an uninitialized property for the located device in response to determining that the second processing complex is not available; and requesting the module, by the device driver, to configure the second part of the fabric to enable access to the located device over the second part of the fabric in response to determining that the located device has the uninitialized property.

24. The article of manufacture of claim 23, wherein determining, by the module, that the second processing complex is unavailable, comprises:

initiating, by the module, communication with the second processing complex via the fabric, wherein the second processing complex is determined to be unavailable if the second processing complex does not respond to the initiated communication.

25. The article of manufacture of claim 23, wherein the module and device driver executing in the first processing complex comprise a first module and first device driver, wherein the module and device driver executing in the second processing complex comprise a second module and second device driver, wherein the operations performed by the module and device driver operating as first and second modules and first and second device drivers further comprise:

communicating, by the first module, information to the second module on the set of the devices accessible through the first part of the fabric in response to determining that the second processing complex is available;

communicating, by the second module, to the second device driver information on the set of the devices communicated from the first module; and configuring, by the second device driver, the set of the devices accessible through the first part of the fabric to enable the second processing complex access to the set of the devices in response to the communication of the information from the second module.

26. The article of manufacture of claim 23, wherein the operations further comprise:

setting, by the module, an initialized property for each device in the first set of the devices accessible through the first part of the fabric; and configuring, by the module, the second part of the fabric to enable access to the devices accessible over the second part of the fabric in response to the request.

27. The article of manufacture of claim 26, wherein the operations further comprise:

setting, by the module, the initialized property for the located device accessible over the second part of the fabric in response to configuring the second part of the fabric; and configuring, by the device driver, all the devices in the first and second parts of the fabric for use by the first processing complex in response to the initializing of the initialized property for the located device accessible.

28. The article of manufacture of claim 26, wherein the operations further comprise:

presenting, by the module, the properties for the devices located on the fabric having the uninitialized or initialized properties to an operating system in response to configuring the second part of the fabric; and presenting, by the operating system, to the device driver the properties for the detected devices on the fabric having the initialized or uninitialized properties.

29. The article of manufacture of claim 23, wherein the operations further comprise:

managing, by the module, operations of multiple logical partitions each executing a separate operating system and device driver interfacing to the devices; and determining, by the module, a logical partition assigned to the located device from an assignment of logical partitions to the devices, wherein the uninitialized property for the located device is passed to the device driver in the determined logical partition.

30. The article of manufacture of claim 23, wherein the operations further comprise:

configuring, by the module, the second part of the fabric to enable communication with the located device in response to the request by the device driver; and configuring, by the device driver, the located device having the property to enable access to the located device in response to the module configuring the second part of the fabric.

31. The article of manufacture of claim 30, wherein the operations further comprise:
  requesting to the module, by the device driver, to rediscover the available devices in response to the module configuring the second part of the fabric, wherein the device driver configures the located device in the second part of the fabric to enable access to the located device in response to rediscovering the available devices; and
  passing the initialized properties for the first set of the devices and the located device to the device driver, wherein the device driver configures all the devices having the initialized property set to enable access to the devices over the first and second part of the fabric.

32. The article of manufacture of claim 23, wherein the device driver in the first processing complex comprises a first device driver, wherein the article of manufacture further implements a second module and second device driver executed in the second processing complex to cause operations to be performed, wherein the operations further comprise:
  configuring, by the first device driver, devices accessible over the fabric to enable access to the devices in response to the module configuring the first and second parts of the fabric;
  communicating, by the first device driver, with the second device driver in the second processing complex when accessing the devices accessible over the fabric in response to determining that the second processing complex is available, and
  enabling access, by the first device driver, to the devices accessible over the fabric without communicating with the second device driver in response to determining that the second processing complex is unavailable.

33. The article of manufacture of claim 23, wherein the operations further comprise:
  determining, by the device driver, whether the second processing complex is available in response to receiving the uninitialized property, wherein the device driver requests the first module to configure the second part of the fabric in response to determining that the second processing complex is unavailable.

34. A method for deploying computing instructions, comprising integrating computer-readable code into a first and second processing complexes, wherein the code executed by the first and second processing complexes is enabled to cause the first and second processing complexes to perform:
  configuring, by a module in the first processing complex, a first part of a fabric enabling communication with a set of devices accessible through the first part of the fabric;
  detecting, by the module, a located device accessible through a second part of the fabric, wherein the second processing complex is designated to configure the second part of the fabric and the located device;
  determining, by the module, whether the second processing complex is available in response to detecting the located device;
  passing, by the module, to a device driver in the first processing complex an uninitialized property for the located device in response to determining that the second processing complex is not available; and
  requesting the module, by the device driver, to configure the second part of the fabric to enable access to the located device over the second part of the fabric in response to determining that the located device has the uninitialized property.

35. The method of claim 34, wherein the code in combination with the first and second processing complexes is enabled to further cause the first and second processing complexes to perform:
  setting, by the module, an initialized property for each device in the first set of the devices accessible through the first part of the fabric; and
  configuring, by the module, the second part of the fabric to enable access to the devices accessible over the second part of the fabric in response to the request.

* * * * *